United States Patent [19]

Ceccon et al.

[11] Patent Number: 4,526,039

[45] Date of Patent: Jul. 2, 1985

[54] REMOVABLE STRAIN GAUGE FIXTURE AND METHOD FOR MEASURING ACCUMULATED STRAIN IN A MATERIAL

[75] Inventors: Harry Ceccon, Boston; Richard A. Murphy, North Abington; H. David Reed, Carlisle; Oscar Orringer, Duxbury, all of Mass.

[73] Assignee: The United States of America as represented by the Secretary of Transportation, Washington, D.C.

[21] Appl. No.: 506,969

[22] Filed: Jun. 23, 1983

[51] Int. Cl.³ .............................................. G01B 7/16
[52] U.S. Cl. ........................................ 73/774; 73/786
[58] Field of Search ................. 73/786, 787, 774, 763, 73/775

[56] References Cited

U.S. PATENT DOCUMENTS

| | | | |
|---|---|---|---|
| 3,858,440 | 1/1975 | Budraitis | 73/774 |
| 3,884,068 | 5/1975 | Dybel | 73/774 |
| 4,048,848 | 9/1977 | Dybel | 73/774 |
| 4,335,614 | 6/1982 | Dybel et al. | 73/774 |

FOREIGN PATENT DOCUMENTS 853755 11/1960 United Kingdom ................. 73/774

*Primary Examiner*—Anthony V. Ciarlante
*Attorney, Agent, or Firm*—O. M. Wildensteiner; H. P. Deeley

[57] ABSTRACT

The invention encompasses a removable strain gauge fixture, and a method for measuring accumulated stress in a structural component, such as a railroad rail. The strain gauge fixture generally comprises first and second side pieces connected by a strain concentrating bar of reduced cross-section, an electronic strain sensor mounted on the bar, and first and second tapered pins extending from the front faces of each of the side pieces. The tapered pins transmit accumulated strain from the component being measured to the strain focusing bar when the pins are inserted into mating holes in the component. The method of the invention generally comprises the steps of providing a pair of holes in the component mateable with the tapered pins of the strain gauge fixture, inserting the tapered pins into the holes of the material in order to transfer accumulated strain in the material to the strain concentrating bar, taking a first strain measurement via the strain sensor on the bar, removing the tapered pins from the material, and taking a second strain reading from the strain sensor.

17 Claims, 7 Drawing Figures

REMOVABLE STRAIN GAUGE FIXTURE AND METHOD FOR MEASURING ACCUMULATED STRAIN IN A MATERIAL

BACKGROUND OF THE INVENTION

1. Field of the Invention

This invention relates to a removable strain gauge fixture, and a method for measuring the accumulated strain in a material, such as the rail of a railroad track.

2. Description of the Prior Art

Strain gauges for measuring strain in structural components are known in the prior art. Typically, such strain gauges generally comprise a strain gauge carrier having an electronic strain sensor mounted thereon. In use, the strain gauge carrier is usually welded or otherwise permanently affixed to the component being measured. A first strain reading is taken when the component is in a strain-free state. Next, the component is subjected to strain, and a second strain reading is taken. The strain, and therefore the stress, is computed by subtracting the values of the two readings, and multiplying the result by an appropriate constant.

While prior art strain gauges are capable of rendering accurate strain measurements in certain applications, such gauges may provide unreliable and inaccurate results when used in a hostile environment over a long period of time. Specifically, such gauges have been known to fail a few years after being attached to a railroad rail, where weather and vibration take a daily toll on both the gauge carrier as well as the delicate electronic strain sensor. Such gauges are not designed to be removed from and reattached to their respective rails, and therefore must remain with the rail and its environment throughout the life of the test.

Clearly, a need exists for a strain gauge and a strain measurement method in which the gauge fixture is easily attachable and removable from the component being measured and hence capable of being stored in an ideal environment when not in use, and which is capable of transferring and measuring accumulated strain when attached onto the component. Ideally, such a strain gauge fixture should be simple and inexpensive to fabricate, and the method of using it should be easy to carry out and capable of rendering accurate, reliable strain measurements.

SUMMARY OF THE INVENTION

The invention relates to a removable strain gauge fixture, and a method for measuring accumulated strain in a material. The removable strain gauge fixture generally comprises a strain gauge carrier including two side pieces connected by a bar of cross-sectional area smaller than that of the side pieces for concentrating strain transmitted to the side pieces, at least one electronic strain sensor mounted on the strain-concentrating bar, and first and second tapered pins extending from the front faces of the first and second side pieces, respectively, for transmitting accumulated strain in a material to the strain-concentrating bar. The strain gauge carrier further includes a pair of longitudinally extendable side braces on opposite sides of the side members to protect the centrally disposed, strain-concentrating bar of reduced cross-sectional area from spurious strains during the attachment or removal of the gauge from the material being measured, thereby enhancing the accuracy of the measurements, and minimizing the danger of damage to the fixture during attachment to and removal from the component.

The method of the invention generally comprises the steps of providing a pair of holes in the material being measured which are mateable with the tapered pins of the removable strain gauge, inserting the pins of the strain gauge fixture into the holes of the material, taking a strain reading from the strain gauge fixture while the gauge fixture is thus inserted, removing the strain gauge fixture, and taking a second reading from the strain gauge after the pins have been removed from the holes in the material.

The strain gauge carrier may be made from the same material as the material being measured, and the method of the invention may further include the step of waiting for the strain-concentrating bar to achieve thermal equilibrium with the material being measured when the tapered pins are inserted into the mating holes of the material. The method of the invention may also include conditioning the mating holes in the material prior to taking any strain gauge readings by forcefully inserting the pins into the mating holes in order to level any high spots in the surfaces defining the holes.

Finally, the method of the invention may further include the step of removing the strain gauge fixture by providing a pair of threaded studs on each of the side pieces opposite its respective tapered pin, providing a U-bar structure having a pair of apertures registrable with the ends of the threaded studs, placing the U-bar over the studs so that the ends of the studs are in registry and extend through the apertures of the bar, and gradually withdrawing the strain gauge fixture from the material being measured by screwing nuts onto the ends of the threaded studs, and alternately tightening these nuts in small increments.

BRIEF DESCRIPTION OF THE SEVERAL FIGURES

DETAILED DESCRIPTION OF THE PREFERRED EMBODIMENT

Figure 1:
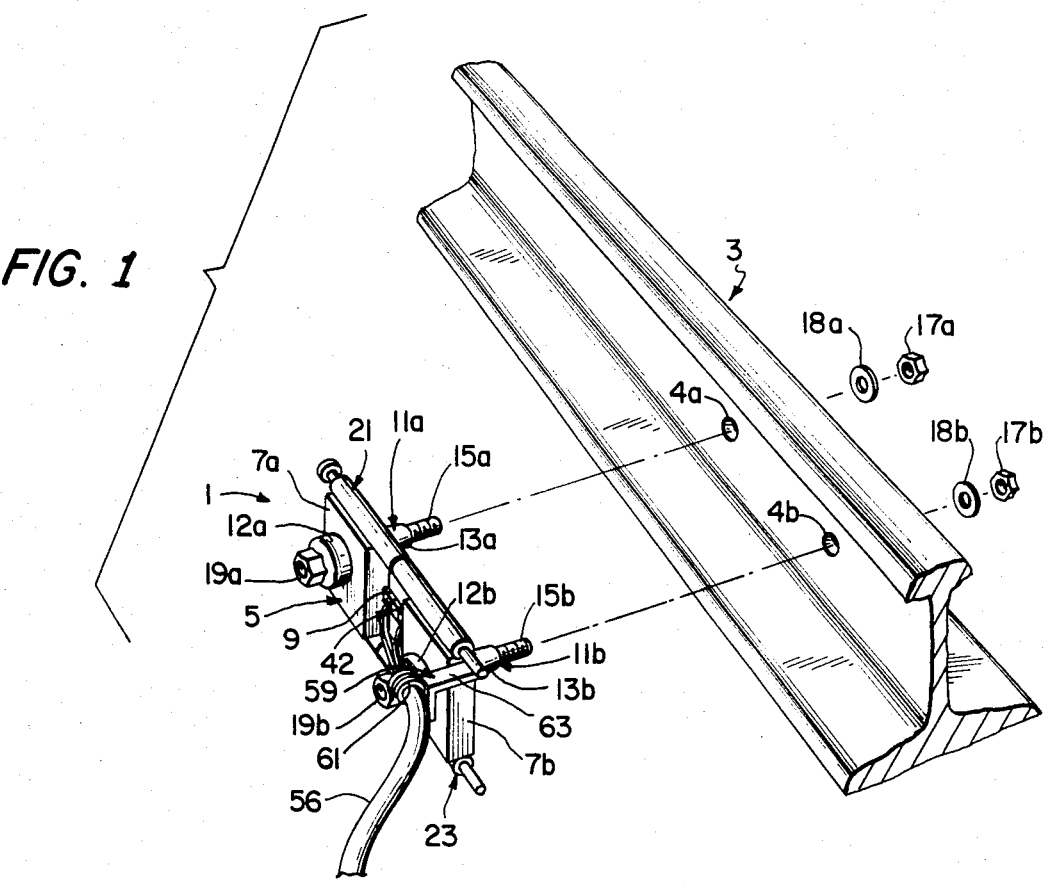
FIG. 1 is an exploded, perspective view of a preferred embodiment of the strain gauge fixture of the invention, illustrating how it may be attached to the web of a railroad rail.
Figure 2:
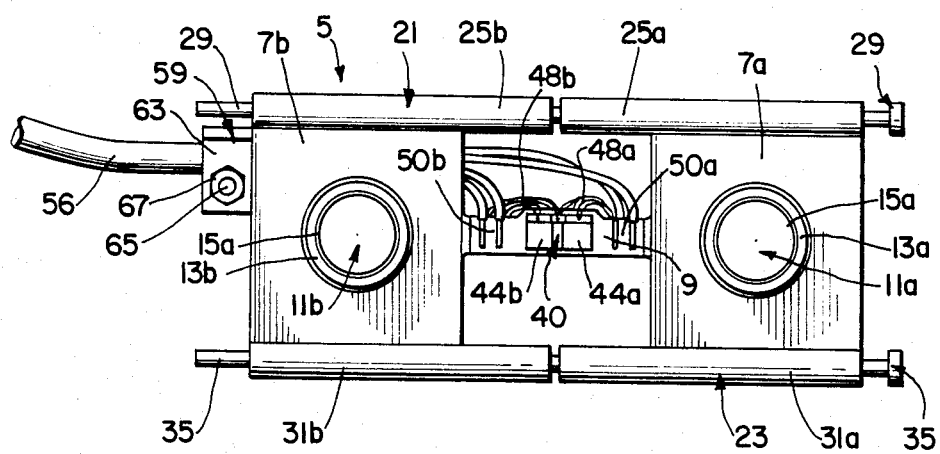
FIG. 2 is a side view of the preferred embodiment of this strain gauge fixture.

With reference now to FIGS. 1 and 2, wherein like numerals designate like parts of the invention, the strain gauge fixture 1 of the invention generally comprises a gauge carrier 5 which includes two symmetrical side pieces 7a, 7b centrally connected together by means of a strain-concentrating bar 9 having a smaller cross-section than side pieces 7a, 7b. Bar 9 carries a pair of electronic strain sensors 40, 42 on its front and back faces, respectively. Preferably, bar 9 is about 1" long, ¼" wide, and about 1/16" thick, while side pieces 7a, 7b are about 1⅜" square as shown, and about ½" thick. Each of the side pieces 7a, 7b includes an orthogonally disposed, tapered pin 11a, 11b, extending from its front face. Generally speaking, the strain gauge fixture 1 of the invention functions by transmitting and concentrating accumulated strain in the material being measured to bar 9. Specifically, accumulated stress is transmitted from the material to the tapered pins 11a, 11b and thence to bar 9 through the relatively heavy side pieces 7a, 7b. Since bar 9 has the smallest cross-section and therefore the smallest spring constant of any part of the gauge carrier 5, the bulk of any strain exerted on the carrier 5 is concentrated along the relatively small cross-section of bar 9, where it is measured by strain sensors 40, 42.

The pins 11a, 11b are preferably mounted in the side pieces 7a, 7b by completely inserting the shank of each pin through a bore (not shown) in its respective side piece, and welding the head and shoulder of each pin into place via a precision welding fixture (also not shown) so that the centers of the pins 11a, 11b vary no more than ±0.0005 inch from a standardized distance. Such precision welding of the pins 11a, 11b in proper position on side pieces 7a, 7b allows them to be inserted into a pair of mating holes 4a, 4b in a material such as the railroad web shown in FIG. 1 without generating spurious or misleading strain on bar 9. Turning now to the structure of the pins 11a, 11b, each includes a tapered shank portion 13a, 13b, respectively. In the preferred embodiment, commercially available 2¾" tapered steel pins are used to form pins 11a, 11b. Such pins have a tapered shank portion approximately 13/16" long, and should preferably have a No. 2 Morse taper. Each of the tapered pins 11a, 11b terminates in a threaded end 15a, 15b. The threaded ends 15a, 15b of the pins allow them to be temporarily secured to a material such as the rail web illustrated via washers and nuts 17a, 18a and 17b, 18b, as shown. More importantly, the threaded ends 15a, 15b, in conjunction with the aforementioned nuts and washers, allow the pins 11a, 11b of gauge carrier 5 to be conveniently pulled through holes 4a, 4b for either conditioning the holes or taking a measurement of the accumulated strain present in the material, as will be more specifically explained hereinafter.

The gauge carrier 5 further includes a top side brace 21 and a bottom side brace 23 for protecting the bar 9 of reduced cross-section from spurious strain due to warping or bending when the strain gauge fixture 1 is being attached to or removed from the web of rail 3. As is best shown in FIG. 2, top side brace 21 includes a pair of serially aligned cylindrical members 25a, 25b which are joined by a pin 29 which is inserted through a centrally disposed bore (not shown) present in each of the cylinders. Analogously, side brace 23 includes a pair of serially aligned cylindrical members 31a, 31b joined by a pin 35 which is likewise inserted through a centrally disposed bore present in each. In each of the side braces 21, 23 the pin 29, 35 has a slightly elevated shoulder (not shown) just under its head, which causes the pin to frictionally engage the cylinders 25a, 31a which house the upper portions of these pins when the pins are tapped into place. By contrast, the pins 29, 35 do not frictionally engage the cylinders 25b, 31b which house the lower portions of the pins. Hence, top side brace 21 and bottom side brace 23 are slidably movable along the longitudinal axis of the gauge carrier 5, and accordingly, will not interfere with the expansion or contraction of bar 9 when strain is applied to the side pieces 7a, 7b of carrier 5 through pins 11a, 11b. By protecting bar 9 from spurious transfer of strain during the attachment and removal of gauge carrier 5 to the material being measured, the side braces 21, 23 allow the use of a smaller cross-section in bar 9 than would be necessary if such braces were not present. This use of a reduced cross-section in bar 9 increases the sensitivity and accuracy of the gauge fixture 1, and reduces the amount of strain applied to the pins 11a, 11b and side pieces 7a, 7b of the gauge carrier 5 when measurements are taken.

The gauge carrier 5 preferably should be completely fabricated from the same material as the component being tested. In this way, the gauge carrier 5 and the material being tested will have the same thermal properties, thereby obviating the use of temperature data when computing strain, and hence force, from the readings obtained from the strain sensors 40, 42.

Strain gauge fixture 1 also includes an electronic strain sensor 40, 42 on the front and back faces of the strain concentrating bar 9, as shown. In the preferred embodiment, sensors 40, 42 each comprise a rosette having two elements 44a, 44b and 46a, 46b, respectively. The two elements of each of the rosettes are oriented 90° to one another. Rosette elements 44a, 46a measure longitudinal strain in bar 9, while rosette elements 44b, 46b measure transverse strain in bar 9. The dual element rosettes may be of conventional, foil-type construction, and form no part of the instant invention. In the preferred embodiment, dual element rosettes (Model Nos. WK-06-125TA-350) manufactured and distributed by Micro-Measurements Companying of Raleigh, N.C. are mounted on the back and front faces of bar 9. The rosette elements 44a, 44b and 46a, 46b measure the strain in bar 9 by varying their resistances as a function of the strain present in bar 9, as will be described in more detail hereinafter.

Figure 3:
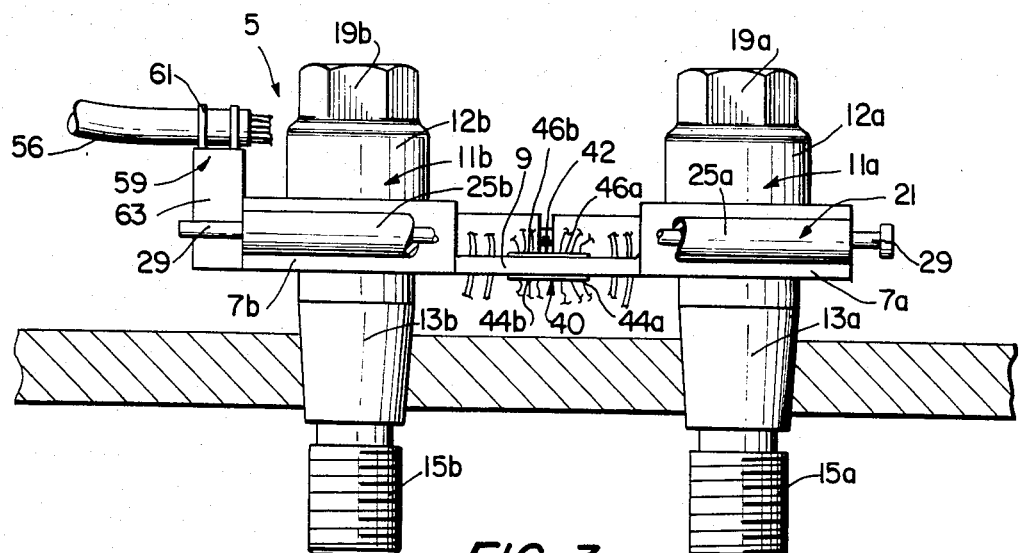
FIG. 3 is a top view of the preferred embodiment of this strain gauge fixture.

With reference now to FIGS. 2 and 3, two wires extend from each element 44a, 44b and 46a, 46b of the rosettes forming sensors 40 and 42. In sensor 40, the wires extending from each of the rosette elements 44a, 44b are connected to electrical terminals 50a, 50b, respectively. Analogously, in sensor 42, the wires extending from each of the rosette elements 46a, 46b are connected to terminals 54a, 54b, respectively. Terminals 50a, 50b and 54a, 54b may be any one of a number of commercially available terminal boards or plug-in modules. Terminals 50a, 50b and 54a, 54b are in turn connected to a coaxial, multi-element input cable 56 of a commercially available strain gauge readout unit 58. In the preferred embodiment, the readout used is a Model No. 120C manufactured by the nationally known BLK Corporation. The coaxial, multi-element cable 56 is attached to the strain gauge carrier 5 via a stress relieving cable mounting assembly 59. Assembly 59 includes a circular cable clamp 61 of conventional construction, which is attached to a right-angle bracket 63. Bracket 63 is in turn attached to side piece 7b through mounting bolt 65 and nut 67, as shown.

Figure 4:
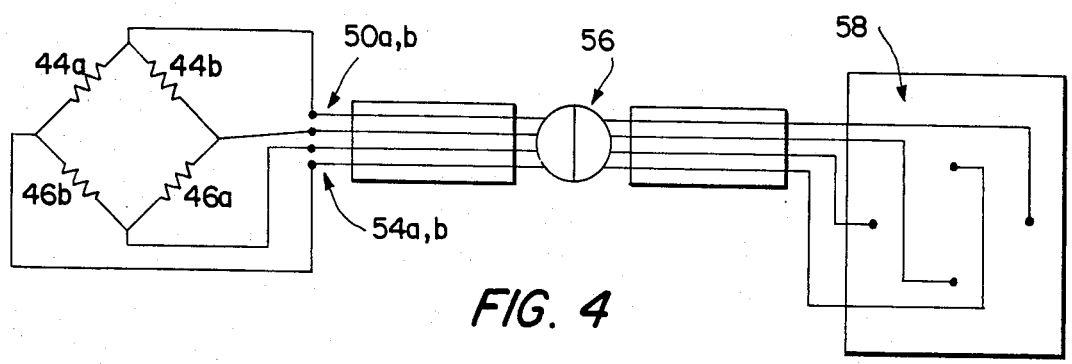
FIG. 4 is a schematic diagram of the electronic circuitry of the strain sensors used in the strain gauge of the invention.

The electronic circuitry of the strain gauge fixture 1 is schematically illustrated in FIG. 4. As shown in the schematic, the outputs of the rosette elements 44a, 44b and 46a, 46b are arranged in a Wheatstone bridge configuration. Specifically, the outputs of the longitudinal rosette elements 44a, 46a are added, as are the outputs of the transverse rosette elements 44b, 46b. The sum of the transverse rosette elements 44b, 46b is subtracted from the sum of the longitudinal rosette elements 44a, 46a.

There are three principal advantages associated with this Wheatstone bridge configuration. First, this bridge configuration amplifies the outputs of the rosette elements by a factor of 2.6. Longitudinally induced strain in bar 9 is multiplied by a factor of 2, since the longitudinal rosette elements 44a, 46a experience the same strain and their outputs are summed in the electrical bridge. In the transverse direction, the strain experienced by transverse rosette elements 44b, 46b is opposite in sign (or direction), and proportional to that in the longitudinal direction by a factor of 0.3 (via Poissons Ratio). Since the transverse oriented strain gauges are likewise added in the electrical bridge, the sum of the two outputs is 0.6. In the bridge, however, transverse outputs are subtracted from the longitudinal outputs so that the algebraic sum of the outputs of rosette elements 44a, 44b and 46a, 46b is 2.6, i.e., $[(2 \times 1) - (2 \times -0.3) = 2.6]$. Further, this bridge configuration also corrects for spurious bendings of bar 9 by the fact that in a bending mode, one side of the bar 9 is in compression and the opposite side in tension by equal amounts. Since the outputs from the two rosette elements of sensor 40 in compression are equal to the outputs of the two rosette elements of sensor 42 in tension, the resultant is zero. Finally, the bridge configuration compensates for thermal expansion. Metals expand equally in all directions; under these conditions, thermally induced strain in the longitudinal directions equals the strain in the transverse direction. In the Wheatstone bridge, the longitudinal strain outputs are substracted from the transverse strain gauge outputs. The resultant of the output subtraction is zero for uniform expansion, thus making the configuration self-correcting for changes in temperature.

Figure 7:
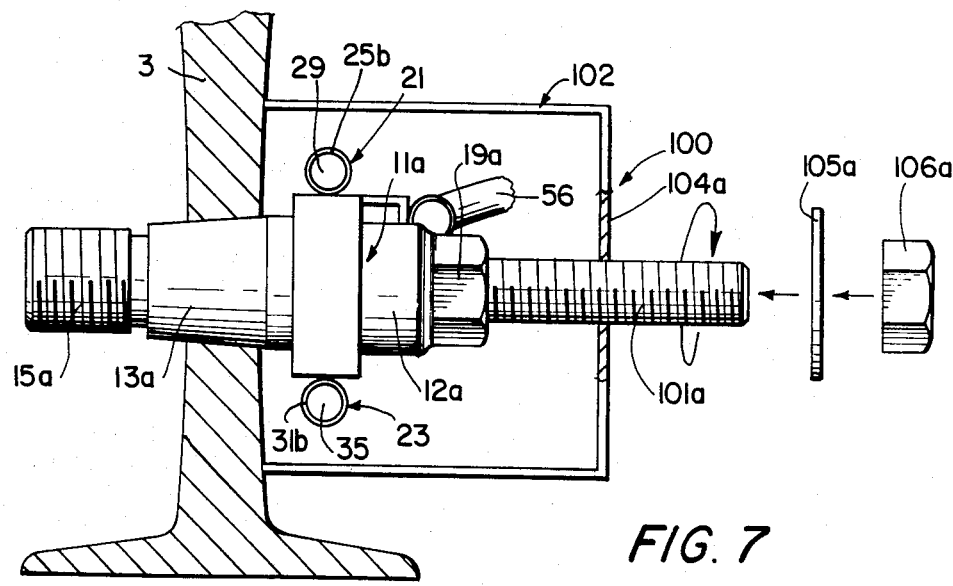
FIG. 7 is a side view of the gauge fixture removal step of the preferred method of the invention.
Figure 5:
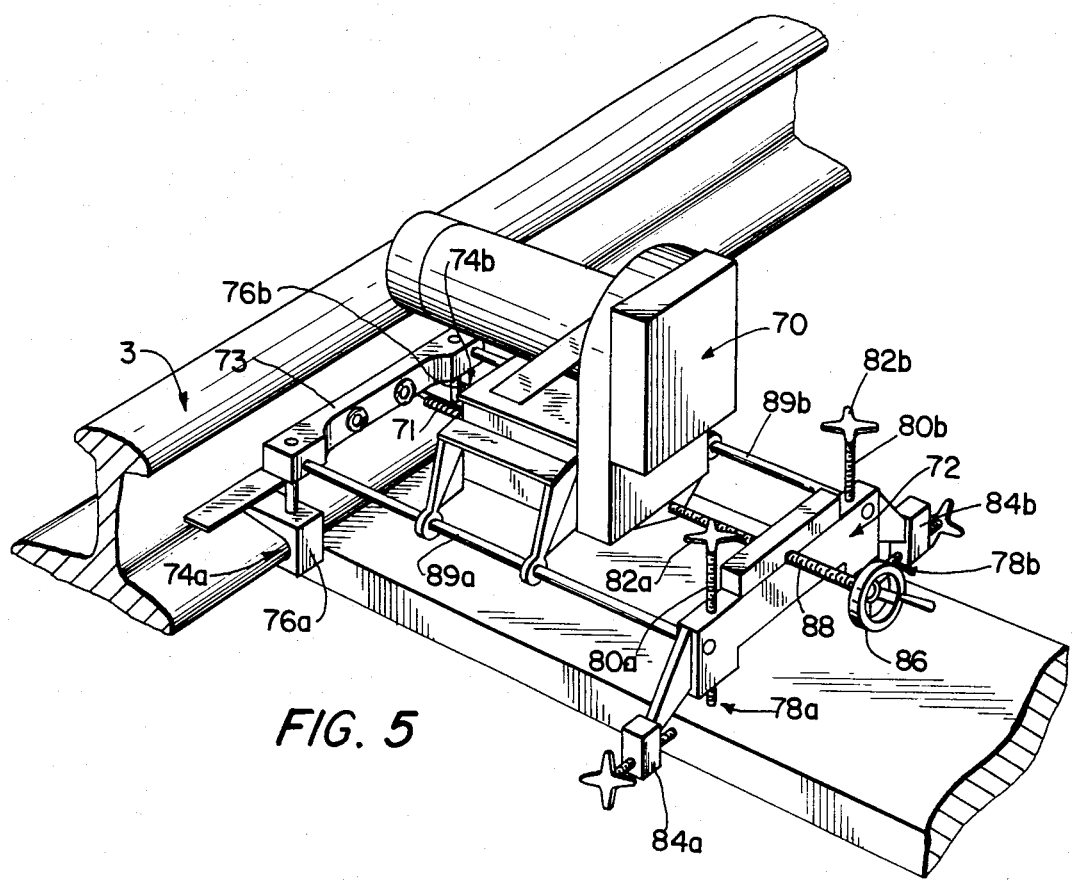
FIG. 5 is a perspective view of the precision drill and jig frame used in the hole drilling and reaming step of the preferred method of the invention.
Figure 6:
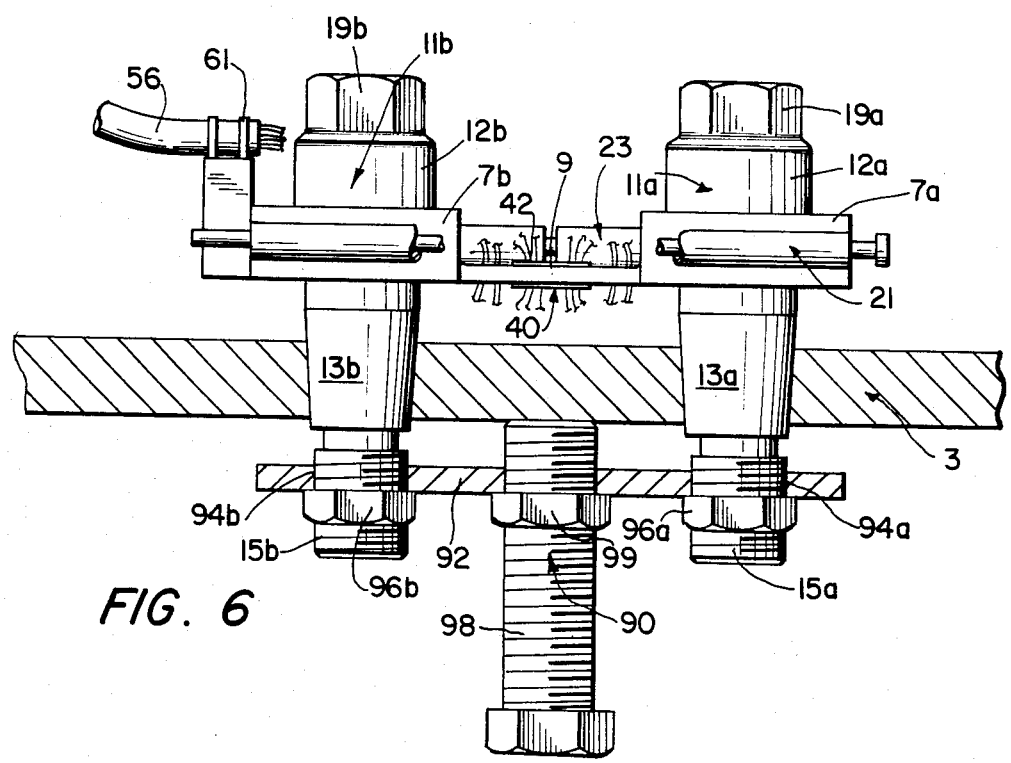
FIG. 6 is a top, partial cross-sectional view of the hole conditioning and gauge fixture attaching step of the preferred method of the invention.

Turning now to the preferred method of the invention, and FIGS. 5 through 7, there are six basic steps in measuring accumulated strain in a material with strain gauge fixture 1. First, as illustrated in FIG. 5, a pair of tapered, mating holes 4a, 4b is drilled and reamed in the material 3 to be measured, which in this case is the web of a railroad rail 3. Second, as shown in FIG. 6, the surfaces defining the holes 4a, 4b are conditioned to remove high spots by forcefully and uniformly pulling the pins through the holes 4a, 4b in the rail web by means of a gauge-attaching assembly 90. Third, the tapered pins 11a, 11b of the strain gauge fixture 1 of the invention are fitted to the pair of holes 4a, 4b to make sure that the distance between the centers of the holes and the pins are within tolerance levels. Fourth, after the rail 3 has undergone strain, the strain gauge fixture 1 is temporarily mounted in the material by again pulling the pins 11a, 11b of the strain gauge fixture 1 forcefully and uniformly through the holes 4a, 4b via gauge fixture attaching assembly 90. A strain reading is taken after the gauge carrier 5 and rail 3 have had an opportunity to establish thermal equilibrium with one another. Fifth, as shown in FIG. 7, the gauge fixture 1 is removed from the material 3 by means of a removal assembly 100 including a U-bar 102, studs 101a, 101b and nuts 106a, 106b. Sixth, a second strain reading is taken from the strain gauge fixture 1 shortly after it is completely removed from the holes 4a, 4b of the web of rail 3. These first and second strain readings may be used to compute the accumulated strain in the material 3, and hence the stress.

Turning again to FIG. 5, and a more detailed description of the preferred method of the invention, a pair of tapered holes mateable with tapered pins 11a, 11b is first drilled and reamed into the material being measured. In FIG. 5, this material corresponds to the web of railroad rail 3. The distance between the centers of the holes drilled and the centers of the tapered pins 11a, 11b should be within ±0.0005 inch in order to avoid spurious readings on the strain gauge fixture 1. Such holes are preferably drilled and reamed by means of a Model SM-1-40 precision rail drill manufactured by Scientific Models, Inc. of Cambridge, Mass., which is slideably mounted on the guide rods 89a, 89b of jig frame 72 as shown. The jig frame 72 guides the bit or reamer 71 through a bit guide 73 on the web of the rail 3. Front feet 74a, 74b of jig frame 72 are capable of securely clamping on the foot of the rail 3 as shown. In the jig frame illustrated, U-clamp members 76a, 76b are used to clamp front feet onto the base of the rail 3. For further securing and positioning the bit guide 73 on the web of rail 4, the jig 72 preferably includes a pair of vertically adjustable rear legs 78a, 78b and clamps 84a, 84b. Rear legs 78a, 78b are formed from threaded shafts 80a, 80b crowned by handles 82a, 82b as shown. Handles 82a, 82b may be adjusted so that the drill bit guide 73 is orthogonally disposed to the surface of the web of rail 3, thereby insuring proper penetration of bit or reamer 71. The pair of manually operable securing clamps 84a, 84b are tightened on either side of a railroad tie in order to secure the jig frame 72 in proper position once the threaded shafts 80a, 80b of rear legs 78a, 78b are adjusted. Jig frame 72 also includes a spindle 86 for rotating a threaded shaft 88 connected to the precision drilling unit 70, so that the unit 70 may be accurately and easily moved along guide rods 89a, 89b. In the preferred method of the invention, a first hole is drilled and reamed via precision drilling unit 70. The chuck (not shown) of the drill is then pivoted over a proper distance, and the second hole is drilled and reamed.

FIG. 6 illustrates the hole conditioning, gauge fixture selection, and gauge fixture attachment steps of the method of the invention. After a pair of mating holes 4a, 4b has been provided by the precision drilling unit 70 and jig frame 72 as previously described, the holes 4a, 4b are conditioned in order to remove any high spots on the surfaces defining these holes by means of a gauge fixture attaching assembly 90. In this step of the invention, a dry lubricant such as moly-disulfide is first applied to the surfaces of both of the pins 11a, 11b and holes 4a, 4b. The pins 11a, 11b are then carefully inserted into the mating holes 4a, 4b until threaded ends 15a, 15b extend through the other side of the web of rail 3 as shown. A pair of self-leveling nuts 96a, 96b are evenly screwed down on the protruding, threaded ends 15a, 15b of the pins 11a, 11b in the position shown. A bolt 98 is threaded through a centrally disposed, threaded aperture in plate 92, which is shown in FIG. 6 as nut 99 welded onto plate 92. When bolt 98 is turned counterclockwise with a torque of approximately 50 pound-feet, any high points in the surfaces defining the tapered holes 4a, 4b are flattened. Rail steel has a yield strength of about 72,000 psi, and the force along the axis of the pins required to generate that pressure is approximately 100,000 pounds. The inventors have found that the recommended torque of 50 pound-feet, when used in connection with a tapered pin having a Morse taper rating of 2, is sufficient to level any high points on the surfaces defining the holes. Such conditioning enhances the accuracy of the readings given by gauge fixture 1.

After the holes are conditioned, the gauge fixture 1 should be removed via the U-bar removal assembly 100 illustrated in FIG. 7. In the first step of this removal procedure, a pair of studs 101a, 101b are threaded into the removal nuts 19a, 19b located on the back faces of side pieces 7a, 7b, respectively. Next, a U-bar 102 having a pair of apertures 104a, 104b registrable with the ends of the studs 101a, 101b is placed over the gauge fixture 1 so that the stud heads extend through the face of the U-bar 102, as shown. Finally, a nut and washer 105a, 106a and 105b, 106b is threaded over each of the heads of the studs 101a, 101b in the manner illustrated. The two nuts 106a, 106b are alternately tightened in small steps of no more than 5 pound-feet to avoid either damaging the gauge carrier 5, or creating a spurious strain in bar 9. (In FIG. 7, only the parts 101a, 104a, 105a and 106a are expressly shown; however, as the assembly is perfectly symmetrical, parts 101b, 104b, 105b and 106b are identical to their "a" counterparts).

In the next step of the method of the invention, a proper strain gauge fixture is selected for holes 4a, 4b to insure that the holes mate with pins 11a, 11b of the gauge fixture 1 to within a tolerance of ±0.0005 inch. This step is performed by first cleaning the inner hole surfaces with trichlorethylene or gasoline, and then applying a dry lubricant, such as moly-disulfide to the pins 11a, 11b and hole surfaces. This gauge fixture 1 is next connected to the readout unit 58, and a reading is taken of the gauge in a stress-free state. The pins 11a, 11b of the gauge fixture 1 are then evenly inserted into the mating holes in the web of rail 3 by hand. Care should be taken to evenly insert pins 11a, 11b into holes 4a, 4b, and not in a cocked position. Next, after the threaded end portions 15a, 15b of the pins extend out of the back of the web of rail 3, the gauge fixture attaching assembly 90 should be used to pull the tapered pins into position on the rail 4 by wringing bolt 98 in increments of 5 pound-feet up to a torque of 50 pound-feet. The strain readings of the gauge fixture 1 should be recorded with every 5 pound-feet increment of torque. If the difference between the strain-free reading of the gauge fixture 1 in any of the 5 pound-feet readings exceeds ±1200 microstrains, the fitting procedure should be aborted and a different gauge fixture 1 selected for the fitting. On the other hand, if the difference between these readings never exceeds ±1200 microstrains at any point in the procedure, the gauge fixture 1 properly mates with the holes 4a, 4b. After the fitting, the gauge fixture 1 should be removed with the U-bar assembly 100 as previously described.

When it is desired to measure the accumulated strain in a material such as rail 3, holes 4a, 4b are again cleaned with trichlorethylene or gasoline, and a dry lubricant such as moly-disulfide is again applied to the surfaces of the holes 4a, 4b and the pins 11a, 11b of the fitted gauge fixture 1. The gauge fixture 1 is again connected to cable 56 of readout unit 58, and a strain-free readout is taken. If the strain-free readout is not within ±25 microstrains of the strain-free calibration value of the gauge fixture 1, the electrical connections of the gauge fixture 1 should be checked for possible damage (i.e., terminals 50a, 50b and 54a, 54b). If the unsatisfactory reading cannot be corrected by checking the electrical connections of the gauge fixture 1, the procedure should be aborted. However, if there is no such unsatisfactory reading, or if the reading is corrected, the pins 11a, 11b of the gauge fixture 1 should be hand-placed in the mating holes 4a, 4b of the web of the rail 3, so that the threaded ends 15a, 15b of the pins 11a, 11b extend through the rail web. Next, the pins 11a, 11b of the gauge fixture 1 should be pulled through the web of the rail 3 via gauge fixture attaching assembly 90 in a similar manner as described in the hole conditioning step, with the exception that a maximum torque of only 30 pound-feet should be initially applied to bolt 98. Next, the bolt 98 should be loosened, and retightened up to 40 pound-feet. Finally, the bolt 98 should be loosened again, and retightened to 50 pound-feet. After the bolt 98 of the gauge fixture attaching assembly 90 is loosened (after being tightened to 50 pound-feet), gauge fixture attaching assembly 90 should be carefully removed. Next, temperature gauges (not shown) should be attached to both the gauge carrier 5 and the web of rail 3. When the temperature gauges indicate that the gauge carrier 5 and web of rail 3 have reached the same temperature, a first strain reading should be recorded. Finally, the U-bar removal assembly 100 should be used to remove the gauge fixture 1 from the rail 3 in the manner heretofore described, and a second strain reading should be taken before the gauge carrier 5 has an opportunity to significantly change its temperature.

After all of the previously mentioned readings have been taken and recorded, the accumulated strain, and therefore stress, in rail 3 is computed via the following formula, where:

$S_f$ = the strain measured with the gauge fixture 1 when the gauge is attached to the rail 4 in a stress-free state, and is in thermal equilibrium (as it should be during the gauge-fitting step);

$S_{fg}$ = the strain measured with the gauge fixture 1 immediately after it has been removed from the rail 4 after the gauge fixture fitting step, and is at the same temperature as the strain-free rail;

$S$ = the strain measured with the gauge fixture 1 when the gauge fixture is attached to the rail 4 in a stressed state, and is at the same temperature as the rail, and $S_{gs}$ = the strain measured with the gauge fixture 1 immediately after it has been removed from the stressed rail 4, and is at the same temperature as the stressed rail.

The net strain $S_n$ measured by the gauge fixture 1 is:

$$(S_{fg} - S_f) - (S_{gs} - S_s) = S_n$$

Consequently, the force $f_n$ measured by the gauge fixture 1 is:

$$S_n \times C_1 = f_n$$

where $C_1$ is the calibration factor for each gauge fixture 1.

Theoretically, the strain gauge fixture 1 is oriented and electrically connected to compensate for thermal expansion and contraction, and under ideal conditions, $S_{fg}$ and $S_{gs}$ would have the same value at any time the reading is taken. But for tests that are performed over long periods of time, the intervals between the $S_{fg}$ and $S_{gs}$ measurements could be months apart, and the value of the readings could change with time, due to aging or other affects which cause long-term drift.

It should be noted that, in order to enhance the accuracy of the readings, holes 4a, 4b may be plugged with cork or rubber (not shown) in order to keep out grit and dust, and to discourage formation of rust on the surfaces defining the holes.

Although the present invention has been described with reference to a preferred embodiment, it should be understood that the invention is not limited to the details thereof. A number of possible substitutions and modifications have been suggested in the foregoing detailed description, and others will occur to those of ordinary skill in the art. All such substitutions and modifications are intended to fall within the scope of the invention as defined in the appended claims.

What is claimed is:

1. A method for measuring the accumulated strain in a material with a removable strain gauge fixture having a pair of tapered pins, comprising the steps of:
    (a) providing a pair of tapered holes in said material which are mateable with said pins of said fixture;
    (b) transferring accumulated strain in said material to said fixture by temporarily mating said pins with said holes, said gauge and pins forming an attached unit during said mating;
    (c) preventing the transfer of spurious strain to said fixture during said mating of said pins with said holes;
    (d) measuring the strain in said fixture; and
    (e) removing the pins of said fixture from said material.

2. The process of claim 1, further including the step of exposing said material to strain after step (a).

3. The process of claim 2, wherein said pins may be mated with said holes essentially without generating strain in said fixture between the time that the holes are provided in said material, and the time that said material is exposed to said strain.

4. The process of claim 1, further including the step of leaving the pins of said fixture in said material long enough for said fixture to reach thermal equilibrium with the material between steps (b) and (c).

5. The process of claim 1, further including the step of conditioning the holes between steps (a) and (b) by forcefully mating the pins with the holes to level high points on the surfaces defining the holes.

6. The process of claim 1, wherein step (a) includes providing a pair of tapered holes whose centers are within about 0.0005 inch of the distance between the centers of the mating pins.

7. The process of claim 1, wherein said strain gauge fixture is made of the same material as the material being measured.

8. The process of claim 1, wherein said strain gauge fixture includes two side pieces connected by a bar having a smaller cross-section relative to the cross-section of said side pieces, and at least one electrical strain sensor mounted on said bar.

9. The process of claim 8, wherein said electrical strain sensor includes two strain gauge rosettes attached to opposite sides of the bar.

10. A method for measuring the accumulated strain in a material with a removable strain gauge fixture having a pair of side pieces connected to each other by a bar having a smaller cross-section relative to the cross-section of side pieces, and a tapered pin on each side piece for transferring strain to the bar of the fixture, comprising the steps of:
    (a) providing a pair of tapered holes in said material which initially mate with said pins without generating significant strain in the bar of said gauge;
    (b) exposing said material to a strain;
    (c) temporarily mating said pins with said holes so that the pins transfer accumulated strain in said material to the bar of said gauge, said gauge and pins forming an attached unit during said mating;
    (d) preventing the transfer of spurious strain to said fixture during said mating of said pins with said holes;
    (e) measuring the strain in the bar of the fixture; and
    (f) removing the pins of the fixture from the tapered holes.

11. A removable strain gauge fixture for measuring the accumulated strain in a material having a pair of tapered holes, comprising:
    (a) first and second side pieces connected by a bar having a smaller cross-section than either of said side pieces;
    (b) first and second parallel, tapered pins on said first and second side pieces, respectively, which are detachably mateable with said pair of tapered holes for transferring any accumulated strain in said material to said bar,
    (c) means for preventing the transfer of spurious strain to said fixture during said mating of said pins with said holes, and
    (d) at least one electrical strain sensor mounted on said bar for measuring the strain in said bar, said sensor and pins forming an attached unit during said mating, whereby the accumulated strain in said material may be computed from said measurement of said strain in said bar.

12. The removable strain gauge fixture of claim 11, wherein the ends of said tapered pins extend completely through the material measured.

13. The removable strain gauge fixture of claim 12, wherein the ends of said tapered pins are threaded for receiving securing nuts when the ends of said pins completely extend through said material.

14. The removable strain gauge fixture of claim 11, wherein said gauge is formed from the same material as the material in which strain is being measured.

15. The strain gauge fixture of claim 11 wherein each of said tapered pins includes a threaded stud for facilitating the removal of its respective pin from its respective hole in said material.

16. The strain gauge fixture of claim 11 wherein the strain sensor includes at least one dual element rosette.

17. The strain gauge fixture of claim 11 further including a pair of side braces mounted on opposite sides of the side pieces of the strain gauge fixture for protecting said bar from spurious strain during the attachment and removal of the fixture from the material being measured.

* * * * *